(12) United States Patent
Zhu

(10) Patent No.: US 11,963,158 B2
(45) Date of Patent: Apr. 16, 2024

(54) TRANSMISSION CONFIGURATION METHOD AND APPARATUS, DEVICE, SYSTEM, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 543 days.

(21) Appl. No.: 17/277,161

(22) PCT Filed: Sep. 21, 2018

(86) PCT No.: PCT/CN2018/107076
§ 371 (c)(1),
(2) Date: Mar. 17, 2021

(87) PCT Pub. No.: WO2020/056751
PCT Pub. Date: Mar. 26, 2020

(65) Prior Publication Data
US 2021/0377972 A1    Dec. 2, 2021

(51) Int. Cl.
*H04W 72/1263*    (2023.01)
*H04W 72/0446*    (2023.01)
*H04W 72/23*    (2023.01)

(52) U.S. Cl.
CPC ... *H04W 72/1263* (2013.01); *H04W 72/0446* (2013.01); *H04W 72/23* (2023.01)

(58) Field of Classification Search
None
See application file for complete search history.

(56) References Cited

U.S. PATENT DOCUMENTS

| 2015/0373741 A1 | 12/2015 | Yerramalli |
| 2017/0041829 A1 | 2/2017 | Dai et al. |

(Continued)

FOREIGN PATENT DOCUMENTS

| CN | 104507108 A | 4/2015 |
| CN | 105025574 A | 11/2015 |

(Continued)

OTHER PUBLICATIONS

International Search Report in the international application No. PCT/CN2018/107076, dated Mar. 1, 2019.
English translation of the Written Opinion of the International Search Authority in the international application No. PCT CN2018/107076, dated Mar. 1, 2019.

(Continued)

*Primary Examiner* — Saumit Shah
(74) *Attorney, Agent, or Firm* — Syncoda LLC; Feng Ma

(57) ABSTRACT

A transmission configuration method includes: an access network device determines idle time domain units within a time window of an unlicensed band; the access network device combines the idle time domain units according to a predefined time domain length of a transmission unit to obtain at least one transmission unit, the transmission unit being used for carrying and transmitting a data packet, and the time domain length of the transmission unit being used for indicating the number of the time domain units included in the transmission unit; the access network device sends a scheduling indication to a terminal, the scheduling indication being used for indicating the at least one transmission unit.

18 Claims, 7 Drawing Sheets

(56) References Cited

U.S. PATENT DOCUMENTS

| | | | |
|---|---|---|---|
| 2017/0310434 A1 | 10/2017 | Harada | |
| 2017/0311291 A1 | 10/2017 | Dai et al. | |
| 2018/0255578 A1 | 9/2018 | Kim | |
| 2019/0268939 A1* | 8/2019 | Yang | H04W 72/20 |
| 2019/0313406 A1* | 10/2019 | Liu | H04W 72/04 |
| 2020/0344759 A1* | 10/2020 | Zheng | H04W 72/20 |
| 2021/0337562 A1* | 10/2021 | Huang | H04W 72/0446 |

FOREIGN PATENT DOCUMENTS

| | | |
|---|---|---|
| CN | 105991497 A | 10/2016 |
| CN | 106063347 A | 10/2016 |
| CN | 107005852 A | 8/2017 |
| CN | 107734662 A | 2/2018 |
| CN | 108282875 A | 7/2018 |
| WO | 2016187931 A1 | 12/2016 |
| WO | 2018028716 A1 | 2/2018 |

OTHER PUBLICATIONS

Huang Xiaoge, Li Yangyang, Liu Sijia, Chen Qianbin, Coexistence mechanism of LTE-U and WiFi systems in the unlicensed spectrum, Journal of Chongqing University of Posts and Telecommunications (Natural Science Edition), vol. 29 No. 5, Oct. 2017. 8 pages with English abstract.

3GPP TSG RAN WG1 Meeting #86bis R1-1610202, Lisbon, Portugal Oct. 10-14, 2016, Source: Wilus Inc. Title: Discussion on Handling UL Multicarrier Transmission under UE power limited case, Agenda item: 7.1.7, Document for: Discussion/Decision, 3 pages.

3GPP TSG RAN meeting #74 RP-162201, Vienna, Austria, Dec. 5-8, 2016, Study Item Name: Study on New Radio Access Technology, Acronym: FS_NR_newRAT, Source: NTT Docomo, Inc., 148 pages.

First Office Action of the Chinese application No. 201880001442.4, dated Oct. 8, 2022.

* cited by examiner

TRANSMISSION CONFIGURATION METHOD AND APPARATUS, DEVICE, SYSTEM, AND STORAGE MEDIUM

CROSS-REFERENCE TO RELATED APPLICATION

This application is a U.S. national stage of International Application No. PCT/CN2018/107076 filed on Sep. 21, 2018, the disclosure of which is hereby incorporated by reference in its entirety.

TECHNICAL FIELD

The present disclosure relates to the technical field of communications, and more particularly, to a transmission configuration method and apparatus, a device, a system and a storage medium.

BACKGROUND

Since a data transmission channel between a terminal and an access network device is a shared channel, the access network device needs to schedule resources for the terminal, and allocate time-frequency resources to the terminal through the resource scheduling, so that the terminal can perform data transmission on the time-frequency resources. Herein, "data transmission" includes transmission of uplink data or reception of downlink data.

SUMMARY

To solve problems in the related art, the present disclosure provides a transmission configuration method and apparatus, a device, a system and a storage medium.

According to a first aspect of the embodiments of the present disclosure, there is provided a transmission configuration method, applied to an access network device, the method including:
  the access network device determines idle time domain units within a time window of an unlicensed frequency band;
  the access network device combines the idle time domain units according to a predefined time domain length of each transmission unit to obtain at least one transmission unit, where the transmission unit is configured to carry one or more data packets for transmission, and the time domain length of the transmission unit is configured to indicate a number of time domain units included in the transmission unit; and
  the access network device sends a scheduling indication to a terminal, the scheduling indication is configured to indicate the at least one transmission unit.

According to a second aspect of the embodiments of the present disclosure, there is a transmission configuration method, applied to a terminal, that the method including:
  the terminal receives a scheduling indication from an access network device, where the scheduling indication is configured to indicate at least one transmission unit for carrying one or more data packets for transmission, and the transmission unit is obtained by combining idle time domain units within a time window of an unlicensed frequency band; and;
  the terminal determines the at least one transmission unit according to the scheduling indication.

According to a third aspect of the embodiments of the present disclosure, there is provided a transmission configuration apparatus, applied to an access network device, the apparatus including:
  a determining module, configured to determine idle time domain units within a time window of an unlicensed frequency band;
  a generating module, configured to combine the idle time domain units determined by the determining module according to a predefined time domain length of each transmission unit to obtain at least one transmission unit, where the transmission unit is configured to carry one or more data packets for transmission, the time domain length of the transmission unit is configured to indicate a number of time domain units included in the transmission unit; and
  a sending module, configured to send a scheduling indication to a terminal, the scheduling indication is configured to indicate the at least one transmission unit.

According to a fourth aspect of the embodiments of the present disclosure, there is provided a transmission configuration apparatus, applied to a terminal, the apparatus including:
  a receiving module, configured to receive a scheduling indication from an access network device, where the scheduling indication is configured to indicate at least one transmission unit for carrying one or more data packets for transmission, and the transmission unit is obtained by combining idle time domain units within a time window of an unlicensed frequency band; and
  a determining module, configured to determine the at least one transmission unit according to the scheduling indication received by the receiving module.

According to a fifth aspect of the embodiments of the present disclosure, there is provided an access network device, including:
  a processor; and
  memory for storing instructions executable by the processor;
  herein the processor is configured to:
  determine idle time domain units within a time window of an unlicensed frequency band;
  combine the idle time domain units according to a predefined time domain length of each transmission unit to obtain at least one transmission unit, the transmission unit is configured to carry one or more data packets for transmission, and the time domain length of the transmission unit is configured to indicate a number of time domain units included in the transmission unit; and
  send a scheduling indication to a terminal, the scheduling indication is configured to indicate the at least one transmission unit.

According to a sixth aspect of the embodiments of the present disclosure, there is provided a terminal, including:
  a processor; and
  memory for storing instructions executable by the processor;
  herein the processor is configured to:
  receive a scheduling indication from an access network device, the scheduling indication is configured to indicate at least one transmission unit for carrying one or more data packets for transmission, and the transmission unit is obtained by combining idle time domain units within a time window of an unlicensed frequency band; and
  determine the at least one transmission unit according to the scheduling indication.

According to a seventh aspect of the embodiments of the present disclosure, there is provided a mobile communication system, which includes the transmission configuration apparatus according to any one of the third aspect and the transmission configuration apparatus according to any one of the fourth aspect, or including the access network device according to any one of the fifth aspect and the terminal according to any one of the sixth aspect.

According to an eighth aspect of embodiments of the present disclosure, there is provided a computer-readable storage medium having stored thereon at least one instruction, at least one program segment, a code set or an instruction set, where the at least one instruction, the at least one program segment, the code set or the instruction set is loaded and executed by the processor to perform the transmission configuration method of the first aspect, or the at least one program segment, the code set or the instruction set is loaded and executed by the processor to perform the transmission configuration method of the second aspect.

The technical solutions provided by the embodiments of the present disclosure may have the following beneficial effects as follows.

Transmission units with different time domain lengths are predefined, and a time domain length of a transmission unit herein refers to a number of time domain units included in the transmission unit. In this way, no matter how many idle time domain units exist within a time window, the idle time domain units can be combined to obtain at least one transmission unit according to a predefined time domain length of each transmission unit. The transmission unit is configured to carry data packet(s) for transmission, it is thus possible to solve a problem of wasting channel resources due to a fact that when a data packet can only be transmitted on a fixed idle time domain unit, if a successfully-occupied idle time domain unit is earlier than the fixed idle time domain unit, the data packet is still not transmitted until the fixed idle time domain unit arrives after waiting; and to achieve an effect of saving the channel resources. It is also possible to solve a problem of having a low data transmission efficiency due to a fact that when a data packet can only be transmitted on a fixed idle time domain unit, if the idle time domain unit is not occupied successfully, the access network device and the terminal need to wait until the next time window to transmit the data packet again; and to achieve an effect of improving the data transmission efficiency.

It is to be understood that the above general descriptions and the following detailed descriptions are merely exemplary and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with the aspects of the present disclosure as recited in the appended claims.

The emergence of new Internet applications, such as Augmented Reality (AR)/Virtual Reality (VR), vehicle-to-vehicle communication and the like, puts forward the higher requirements for wireless communication technology, and drives wireless communication technology to continuously evolve to meet the application requirements. At present, the cellular mobile communication technology is in the evolution stage of a new generation of technology. An important feature of the new generation technology here is that it supports flexible configuration of multiple business types. Different types of services have different requirements for the wireless communication technology. For instance, the main requirements of the enhanced Mobile Broad Band (eMBB) service focus on the large bandwidth, the high rate and the like; the main requirements of the Ultra Reliable Low Latency Communication (URLLC) service focus on the high reliability and the low delay; the main requirements of the massive Machine Type Communication (mMTC) service focus on the large number of connections. Therefore, a new generation wireless communication system requires a flexible and configurable design to support transmission of multiple types of service.

Figure 1:
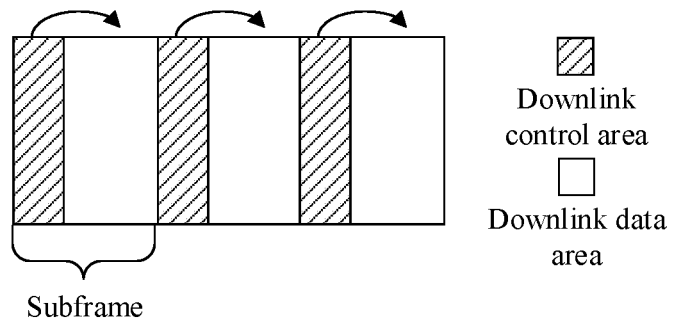
FIG. 1 is a schematic diagram of a resource scheduling method in an LTE system.

For dynamic scheduling in a Long Term Evolution (LTE) system, one scheduling signaling can only indicate one time-frequency resource which is used to indicate a frequency-domain resource in a time-domain unit. The time domain unit herein is a time unit, and may be a time domain unit commonly used in communication systems, such as symbols, subframes, time slots and radio frames. Referring to FIG. 1, it shows a schematic diagram of a resource scheduling method in an LTE system. In FIG. 1, it is illustrated by taking a time domain unit as a subframe, and a shaded area and a white-filled area constitute a subframe, where the shaded area is a downlink control area for transmitting control signaling. Herein, the control signaling includes scheduling signaling to instruct a terminal to perform data transmission on time-frequency resource indicated by an arrow in FIG. 1. The white-filled area is a downlink data area, i.e. the time-frequency resource indicated by an arrow of the scheduling signaling, which is used for data transmission by the terminal.

Figure 2:
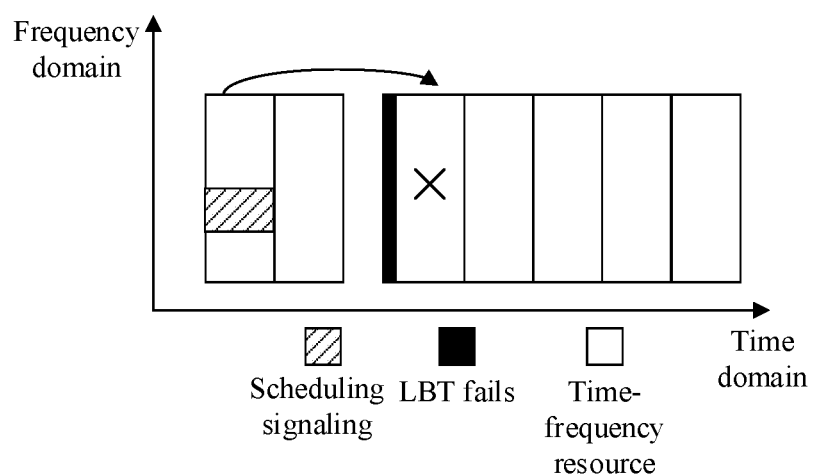
FIG. 2 is a schematic diagram of resource allocation for an unlicensed frequency band.

An unlicensed band is a competitive band. Multiple communication systems of different standards may contend for the use of frequency domain resources on an unlicensed frequency band. For instance, a Wireless Fidelity (Wi-Fi) system and an LTE system may contend for use of frequency domain resources on an unlicensed frequency band. If the time-frequency resource allocated to the terminal in the LTE system is a time-frequency resource on an unlicensed frequency band, the channel may be occupied by a communication system of another standard, that is, the channel occupation is uncertain, and thus, even if a time-frequency resource is allocated to the terminal through scheduling signaling, the terminal may not successfully occupy the time-frequency resource, resulting in that the terminal cannot perform data transmission on the time-frequency resource. Referring to FIG. 2, it shows a schematic diagram of resource allocation of an unlicensed frequency band, herein a shaded area is scheduling signaling, a white-filled area is a time-frequency resource, and an arrow of scheduling signaling points to a time-frequency resource allocated to a terminal. Before occupying the time-frequency resource, the terminal needs to perform Listen Before Talk (LBT, Carrier Sensing), that is, a black-filled area. When it is detected that the channel is occupied, that is, LBT fails, the terminal cannot occupy the time-frequency resource. When it is detected that the channel is not occupied, that is, the LBT succeeds, the terminal may occupy the time-frequency resource.

In the related art, an access network device and a terminal may transmit data packets in fixed idle time domain units. When the time window and the position of the idle time domain units are fixed, the number of idle time domain units included in the transmission unit is also fixed. Assuming that the time window is a time slot including 14 symbols, the time domain unit is a symbol and the position of a fixed idle time domain unit is the position of the 8th symbol, then a transmission unit fixedly includes 7 symbols. When the access network device occupies a channel resource on the 6th symbol, a scheduling indication may be sent to the terminal on the 7th symbol, and the scheduling indication may be used to instruct the terminal and the access network device to transmit the data packets on the 8th-14th symbols. If the access network device occupies the channel resource on the 1st-5th symbols, it is still necessary to instruct the terminal and the access network device to transmit the data packets on the 8th-14th symbols, and the remaining symbols are not used to carry the data packets, resulting in waste of the channel resource. If the access network device occupies channel resources on the 7th-14th symbols, it is necessary to instruct the terminal and the access network device to transmit data packets on the 8th-14th symbols in the next time slot, resulting in low data transmission efficiency.

In the present embodiment, the transmission units with different time domain lengths are predefined. The time domain length of the transmission unit herein refers to the number of time domain units included in the transmission unit, and then each transmission unit is obtained through combination according to the number of idle time domain units in the time window such that the number of idle time domain units is greater than or equal to the sum of the numbers of time domain units included in all transmission units. In this way, no matter how many idle time domain units exist within a time window, the idle time domain units can be combined to obtain at least one transmission unit according to a predefined time domain length of each transmission unit. The transmission unit is configured to carry data packet(s) for transmission, it is thus possible to solve a problem of wasting channel resources due to a fact that when a data packet can only be transmitted on a fixed idle time domain unit, if a successfully-occupied idle time domain unit is earlier than the fixed idle time domain unit, the data packet is still not transmitted until the fixed idle time domain unit arrives after waiting; and to achieve an effect of saving the channel resources. It is also possible to solve a problem of having a low data transmission efficiency due to a fact that when a data packet can only be transmitted on a fixed idle time domain unit, if the idle time domain unit is not occupied successfully, the access network device and the terminal need to wait until the next time window to transmit the data packet again; and to achieve an effect of improving the data transmission efficiency.

It should be noted that after the transmission unit is configured, a data packet may be transmitted between the access network device and the terminal. The transmission process may include: the access network device sends a downlink data packet to the terminal, and the terminal sends an uplink data packet to the access network device. Duplicate discussion will be omitted below.

Figure 3:
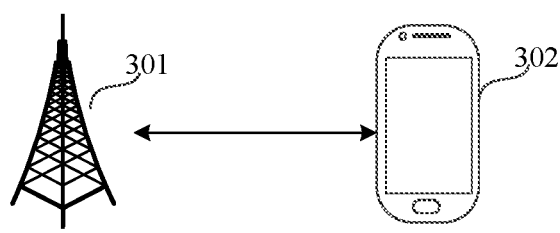
FIG. 3 is a schematic diagram of a mobile communication system, according to various embodiments of the present disclosure.

FIG. 3 shows a schematic structural diagram of a mobile communication system according to an embodiment of the present disclosure. The mobile communication system may be a 5G system, also known as a New Radio (NR) system. The mobile communication system includes an access network device 301 and a terminal 302.

The access network device 301 may be a base station. For instance, a base station may be a base station (gNB) employing a centralized distributed architecture in a 5G system. When the access network device 301 employs a centralized distributed architecture, it generally includes a Central Unit (CU) and at least two Distributed units (DU). A protocol stack of a Packet Data Convergence Protocol (PDCP) layer, a Radio Link Control (RLC) control protocol layer, and a Media Access Control (MAC) layer is provided in the Central Unit; a Physical (PHY) layer protocol stack is provided in the distribution unit. The specific implementation of the access network device 301 is not limited in the embodiment of the present disclosure. Optionally, the access network device 301 may further include a home base station (Home eNB, HeNB), a Relay, a Pico base station, etc.

The access network device 301 and the terminal 302 establish a wireless connection through a wireless air interface. Optionally, the wireless air interface is a wireless air interface based on a fifth generation mobile communication network technology (5G) standard, such as a new air interface (New Radio, NR). Alternatively, the wireless air interface may be a wireless air interface based on the next generation mobile communication network technology standard of 5G.

Terminal 302 may be a device that provides voice and/or data connectivity to a user. The terminal 302 may communicate with one or more core networks via Radio Access Network (RAN), the terminal 302 may be a mobile terminal, such as a mobile phone (or referred to as "cellular" phone) and a computer having a mobile terminal, For instance, may be a portable, pocket-sized, handheld, computer built-in, or in-vehicle mobile device. For instance, a Subscriber Unit, a Subscriber Station, a Mobile station, a Mobile, a Remote Station, an Access Point, a Remote Terminal, an Access Terminal, a User Terminal, a User Agent, a User Device, or a User Equipment.

It should be noted that, in the mobile communication system shown in FIG. 3, a plurality of access network devices 301 and/or a plurality of terminals 302 may be included. An access network device 301 and a terminal 302 are shown in FIG. 3 for illustration, but it is not limited in the embodiment.

Figure 4:
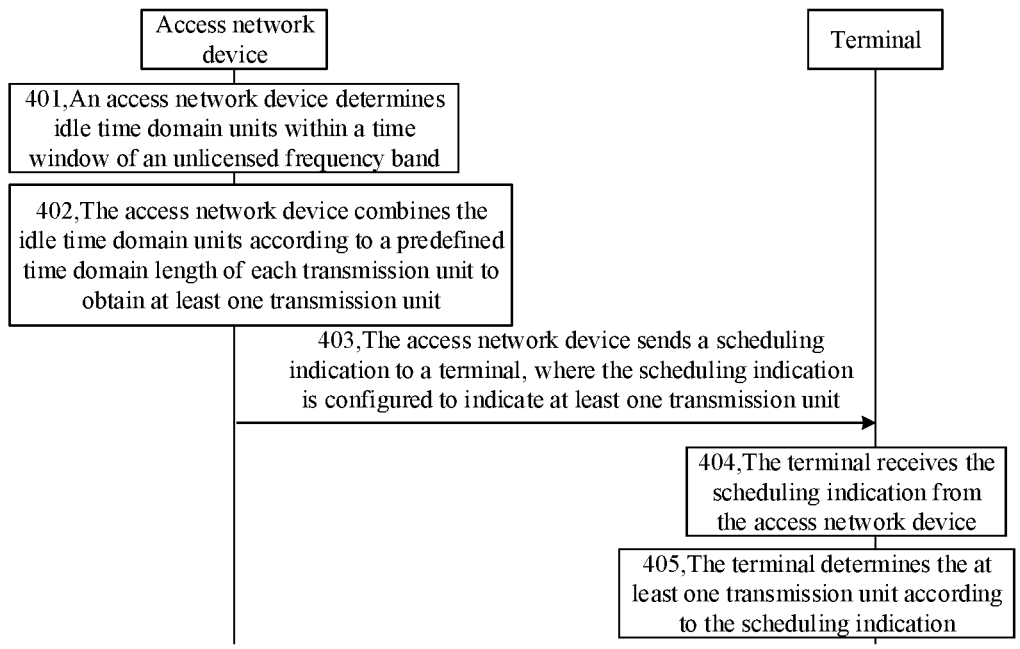
FIG. 4 is a flowchart of one transmission configuration method, according to an exemplary embodiment.

FIG. 4 is a flowchart of a transmission configuration method according to an exemplary embodiment, which is applied to the mobile communication system shown in FIG. 3. As shown in FIG. 4, the transmission configuration method includes the following operations.

In operation 401, an access network device determines idle time domain units within a time window of an unlicensed frequency band.

In operation 402, the access network device combines the idle time domain units according to a predefined time domain length of each transmission unit to obtain at least one transmission unit.

Specifically, the transmission unit is configured to carry one or more data packets for transmission, and the time domain length of the transmission unit is configured to indicate a number of time domain units included in the transmission unit.

In operation 403, the access network device sends a scheduling indication to a terminal, where the scheduling indication is configured to indicate at least one transmission unit.

In operation 404, the terminal receives the scheduling indication from the access network device.

In operation 405, the terminal determines the at least one transmission unit according to the scheduling indication.

Herein, operations 401-403 can be separately implemented as an embodiment on the access network device side, and operations 404-405 can be separately implemented as an embodiment on the terminal side.

In summary, in the transmission configuration method provided by the present disclosure, transmission units of different time domain lengths are predefined, and a time domain length of a transmission unit herein refers to a number of time domain units included in the transmission unit. In this way, no matter how many idle time domain units exist within a time window, the idle time domain units can be combined to obtain at least one transmission unit according to a predefined time domain length of each transmission unit. The transmission unit is configured to carry data packet(s) for transmission, it is thus possible to solve a problem of wasting channel resources due to a fact that when a data packet can only be transmitted on a fixed idle time domain unit, if a successfully-occupied idle time domain unit is earlier than the fixed idle time domain unit, the data packet is still not transmitted until the fixed idle time domain unit arrives after waiting; and to achieve an effect of saving the channel resources. It is also possible to solve a problem of having a low data transmission efficiency due to a fact that when a data packet can only be transmitted on a fixed idle time domain unit, if the idle time domain unit is not occupied successfully, the access network device and the terminal need to wait until the next time window to transmit the data packet again; and to achieve an effect of improving the data transmission efficiency.

Figure 5:
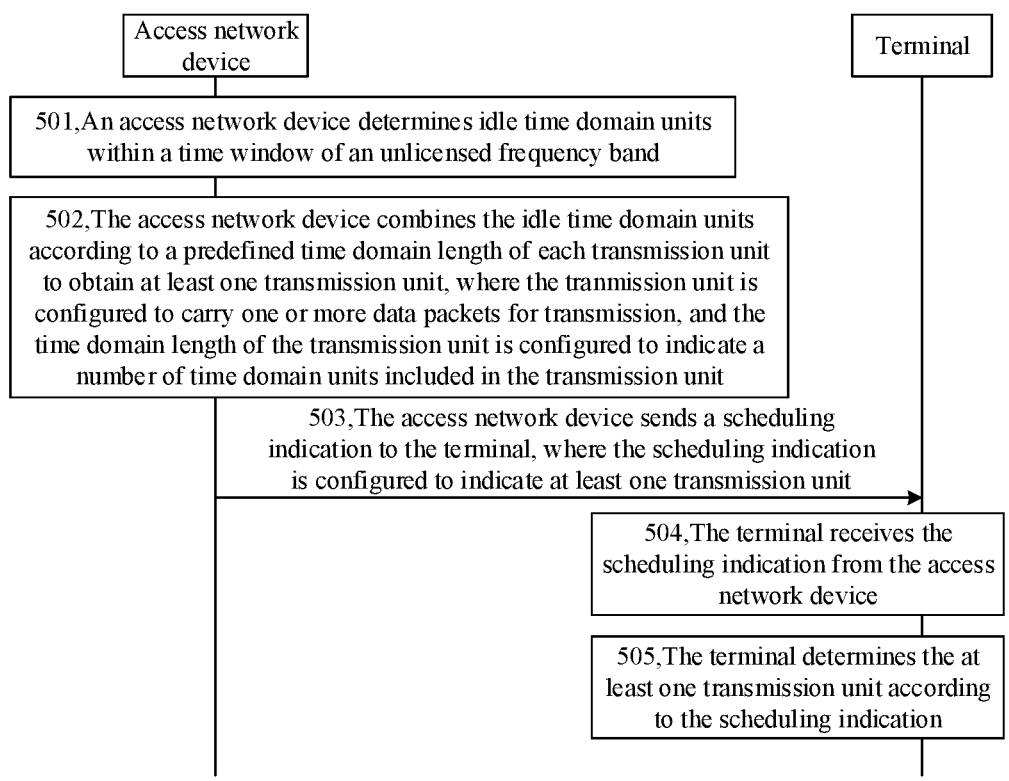
FIG. 5 is a flowchart of one transmission configuration method, according to an exemplary embodiment.

FIG. 5 is a flowchart of a transmission configuration method according to another exemplary embodiment, which is applied to the mobile communication system shown in FIG. 3. As shown in FIG. 5, the transmission configuration method includes the following operations.

In operation 501, an access network device determines idle time domain units within a time window of an unlicensed frequency band.

The time window is a concept on the time domain, and one time window contains at least two time domain units. In a possible implementation, the time window is one time slot, then the time domain unit may be one symbol, and in this case, the time window may include fourteen time domain units.

The idle time domain units in the time window refer to remaining time domain units in the time window that can be used to carry data for transmission after the access network device successfully occupies the channel resource. For instance, when occupying the channel resource on the sixth symbol, the access network device may send the scheduling signaling to the terminal on the 7th symbol, and the remaining time domain units for carrying data for transmission are the 8th-14th symbols. The 8th-14th symbols can be referred to as idle time domain units within the time window.

In operation 502, the access network device combines the idle time domain units according to a predefined time domain length of each transmission unit to obtain at least one transmission unit, where the transmission unit is used to carry data packet(s) for transmission, and the time domain length of the transmission unit is used to indicate the number of time domain units included in the transmission unit.

The predefined transmission units may have different time domain lengths. For instance, a predefined time domain length of one transmission unit is one symbol, a time domain length of another transmission unit is two symbols, and the time domain length of a third transmission unit is three symbols, and so on.

In the embodiment, the time domain length of the transmission unit may be indicated by a time domain length indication. In an implementation, the time domain length indication may be predefined in the access network device, and the access network device may directly read the time domain length indication from the access network device, and then determine the time domain length of the predefined transmission unit according to the time domain length indication.

For ease of understanding, the transmission unit herein may be understood as a container for carrying data packet(s) for transmission. For instance, a transmission unit including one symbol may carry a data packet occupying one symbol in the time domain, a transmission unit including two symbols may carry a data packet occupying two symbols in the time domain, and a transmission unit including three symbols may carry a data packet occupying three symbols in the time domain.

Figure 6:
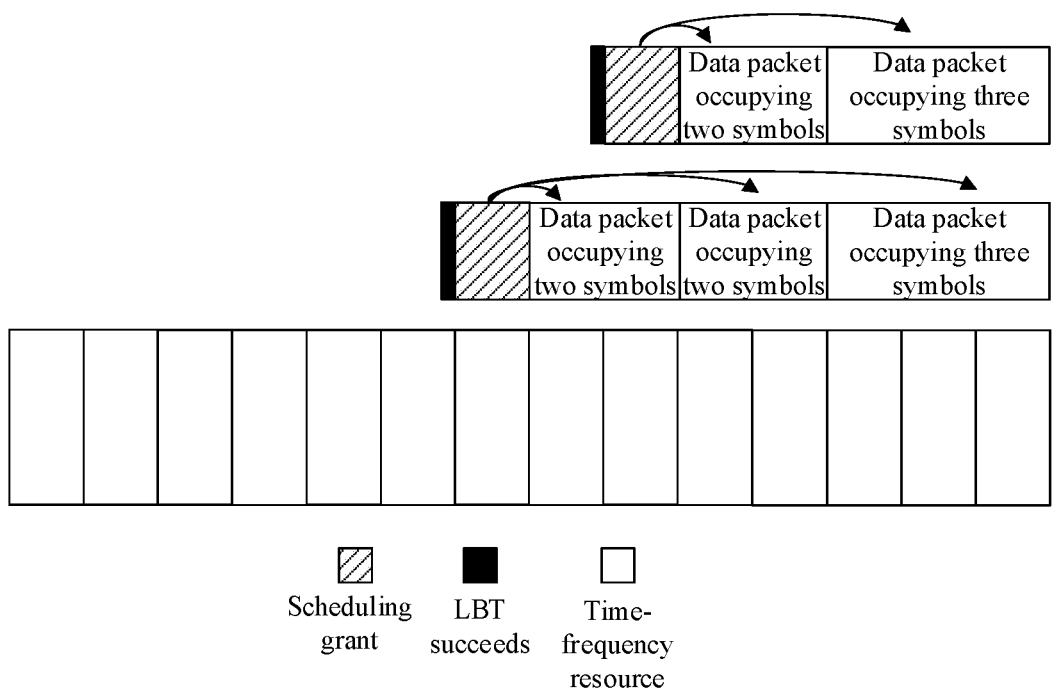
FIG. 6 is a schematic diagram of a transmission unit, according to another exemplary embodiment.

In the embodiment, after acquiring the number of idle time domain units and the time domain length of the at least one transmission unit, the access network device may combine the idle time domain units according to the number and the time domain length of the transmission unit to obtain the at least one transmission unit. Then, each transmission unit includes at least one idle time domain unit, and the number of idle time domain units within the time window is greater than or equal to the sum of numbers of idle time domain units included in all transmission units. Assuming that the time domain unit is a symbol and the number of idle symbols is 7, the access network device may perform combining operation to obtain two transmission units each including two symbols and one transmission unit including three symbols. Assuming that the number of idle symbols is 5, the access network device may perform combining operation to obtain one transmission unit including two symbols and one transmission unit including three symbols, reference is made to FIG. 6.

In operation 503, the access network device sends a scheduling indication to the terminal, where the scheduling indication is configured to indicate at least one transmission unit.

After determining the transmission unit, the access network device needs to generate a scheduling indication for indicating the transmission unit, and send the scheduling indication to the terminal. In a possible implementation, the access network device may send scheduling signaling carrying the scheduling indication to the terminal.

When data packets are transmitted between an access network device and a terminal, if the access network device schedules one data packet in one scheduling signaling, the data packet may be transmitted on continuous idle time domain units or may be transmitted on non-continuous idle time domain units. Alternatively, if the access network device schedules a plurality of data packets in one scheduling signaling, each data packet is transmitted on the continuous idle time domain units, and different data packets may be transmitted on the continuous or non-continuous idle time domain units. Two application scenarios in which different data packets are transmitted on continuous or non-continuous idle time domain units will be described below.

1) In a first implementation, one data packet is transmitted on continuous idle time domain units, and different data packets are transmitted on continuous idle time domain units. That is, the idle time domain units included in all adjacent transmission units are continuous. In this case, if the transmission unit is represented by a time domain start position for transmitting the data packet, the scheduling indication is used to indicate the time domain start position.

Since each data packet is transmitted on continuous idle time domain units, the access network device may determine a time domain start position of each data packet according to each combined transmission unit and a length of each data packet, and generate a scheduling indication for indicating the time domain start position. One data packet may be carried on one transmission unit for transmission, or may be carried on at least two transmission units for transmission, which is not limited in the embodiment.

Assuming that the idle time domain units are the 8th-14th symbols, the transmission units obtained by combination according to the service requirement of the terminal are two transmission units each including two symbols and one transmission unit including three symbols. If the first data packet occupies two symbols, the second data packet occupies two symbols and the third data packet occupies three symbols, the time domain start positions of the three data packets indicated by the scheduling indication are the 8th symbol, the 10th symbol, and the 12th symbol, respectively. If the first data packet occupies four symbols and the second data packet occupies three symbols, the time domain start positions of the two data packets indicated by the scheduling indication are the 8th symbol and the 12th symbol, respectively.

2) In a second implementation, one data packet is transmitted on continuous idle time domain units, and different data packets are transmitted on non-continuous idle time domain units. That is, the idle time domain units included in all adjacent transmission units are continuous. Alternatively, one data packet is transmitted on continuous idle time domain units, and different data packets are transmitted on non-continuous idle time domain units. That is, there are non-continuous idle time domain units included in at least one group of adjacent transmission units. In this case, if the transmission unit is represented by the time domain start position for transmitting the data packet and the length of the time domain resource occupied by the data packet, the scheduling indication is used to indicate the time domain start position and the length of the time domain resource.

The access network device may determine a time domain start position of each data packet and a length of time domain resource occupied by each data packet according to each transmission unit obtained by the combination and a length of each data packet, and generate a scheduling indication for indicating the time domain start position and the length of the time domain resource. One data packet may be carried in one transmission unit for transmission, or may be carried in at least two transmission units for transmission, which is not limited in the embodiment.

Assuming that the idle time domain units are the 8th-14th symbols, the transmission units obtained by the combination according to the service requirement of the terminal are three transmission units each including two symbols. If the first data packet occupies two symbols, the second data packet occupies two symbols and the third data packet occupies two symbols, the time domain start position of the first data packet indicated by the scheduling indication is the 8th symbol, and the length of the time domain resource is two symbols; the time domain start position of the second data packet indicated by the scheduling indication is the 11th symbol, and the length of the time domain resource is two symbols; and the time domain start position of the third packet indicated by the scheduling indication is the 13th symbol, and the length of the time domain resource is two symbols. If the first data packet occupies four symbols and the second data packet occupies two symbols, the time domain start position of the first data packet indicated by the scheduling indication is the 8th symbol, and the length of the time domain resource is four symbols; and the time domain start position of the second packet indicated by the scheduling indication is the 13th symbol, and the length of the time domain resource is two symbols.

3) In a third implementation, one data packet is transmitted on continuous idle time domain units, and different data packets are transmitted on continuous idle time domain units. That is, idle time domain units included in all adjacent transmission units are continuous. Alternatively, one data packet is transmitted on continuous idle time domain units, and different data packets are transmitted on non-continuous idle time domain units. That is, there are non-continuous idle time domain units included in at least one group of adjacent transmission units. In this case, if the transmission unit is represented by the time domain start positions for transmitting the data packet and the time domain length of the transmission unit, the scheduling indication is used to indicate the time domain start position, and the time domain length indication sent by the access network device to the terminal is used to indicate the time domain length of the transmission unit.

The access network device may determine the time domain start position of each data packet and the time domain length of the transmission unit carrying each data packet according to each transmission unit obtained by the combination and the length of each data packet, and generate a scheduling indication for indicating the time domain start position. One data packet may be carried on one transmission unit for transmission, or may be carried on at least two transmission units for transmission, which is not limited in the embodiment.

Assuming that the idle time domain units are the 8th-14th symbols, the transmission units obtained by the combination according to the service requirement of the terminal is three transmission units each including two symbols. If the first data packet occupies two symbols, the second data packet occupies two symbols and the third data packet occupies two symbols, the time domain start position of the first data packet indicated by the scheduling indication is the 8th symbol, and the time domain length of the transmission unit indicated by the time domain length indication is two symbols; the time domain start position of the second data packet indicated by the scheduling indication is the 11th symbol, and the time domain length of the transmission unit indicated by the time domain length indication is two symbols; and the time domain start position of the third data packet indicated by the scheduling indication is the 13th symbol, and the time domain length of the transmission unit indicated by the time domain length indication is two symbols. If the first data packet occupies four symbols and the second data packet occupies two symbols, the time domain start position of the first data packet indicated by the scheduling indication is the 8th symbol, and the time domain length of the transmission unit indicated by the time domain length indication is four symbols; and the time domain start position of the second data packet indicated by the scheduling indication is the 13th symbol, and the time domain length of the transmission unit indicated by the time domain length indication is two symbols.

It should be noted that the access network device may first send a time domain length indication to the terminal, and then send a scheduling indication to the terminal.

4) In a fourth implementation, one data packet is transmitted on continuous idle time domain units, and different data packets are transmitted on continuous idle time domain units. That is, idle time domain units included in all adjacent transmission units are continuous. Alternatively, one data packet is transmitted on continuous idle time domain units, and different data packets are transmitted on non-continuous idle time domain units. That is, there are non-continuous idle time domain units included in at least one group of adjacent transmission units. In this case, if the transmission unit is represented by a time domain start position for transmitting the data packets and a time domain length of the transmission unit, the scheduling indication is used to indicate the time domain start position, and the terminal determines the time domain length of the transmission unit according to a time domain length indication predefined in the terminal.

The fourth implementation is similar to the third implementation, except that in the fourth implementation, the time domain length of the transmission unit is predefined in the terminal, and the access network device may not send the time domain length indication to the terminal.

Assuming that the idle time domain units are the 8th-14th symbols, the transmission units obtained by the combination according to the service requirement of the terminal are three transmission units each including two symbols. If the first data packet occupies two symbols, the second data packet occupies two symbols and the third data packet occupies two symbols, the time domain start position of the first data packet indicated by the scheduling indication is the 8th symbol; the time domain start position of the second data packet indicated by the scheduling indication is the 11th symbol; and the time domain start position of the third packet indicated by the scheduling indication is the 13th symbol. If the first data packet occupies four symbols and the second data packet occupies two symbols, the time domain start position of the first data packet indicated by the scheduling indication is the 8th symbol; and the time domain start position of the second packet indicated by the scheduling indication is the 13th symbol.

In operation 504, the terminal receives the scheduling indication from the access network device.

In operation 505, the terminal determines the at least one transmission unit according to the scheduling indication.

In accordance with the above four scheduling indications, an implementation of determining the at least one transmission unit by the terminal will be described below.

1) Corresponding to the first implementation described above, the scheduling indication indicates the time domain start position, and the terminal determines that one data packet is transmitted on the continuous time domain units, and that different data packets are transmitted on the continuous time domain units, that is, the idle time domain units included in all adjacent transmission units are continuous. In this case, the terminal may determine the transmission unit according to the time domain start position.

Assuming that the time domain start positions of the three data packets indicated by the scheduling indication are the 8th symbol, the 10th symbol and the 12th symbol, respectively, the terminal may determine that a time domain length of a transmission unit carrying the first data packet for transmission is two symbols, and the transmission unit includes the 8th-9th symbols; a time domain length of a transmission unit carrying a second data packet for transmission is two symbols, and the transmission unit includes the 10th-11th symbols; and a time domain length of a transmission unit carrying a third data packet for transmission is three symbols, and the transmission unit includes the 12th-14th symbols. Assuming that the time domain start positions of the two data packets indicated by the scheduling indication are the 8th symbol and the 12th symbol, respectively, the terminal may determine that the time domain length of the transmission unit carrying the first data packet for transmission is four symbols, and the transmission unit includes the 8th-11th symbols; and the time domain length of the transmission unit carrying the second data packet for transmission is three symbols, and the transmission unit includes the 12th-14th symbols.

2) Corresponding to the second implementation described above, the scheduling indication indicates a time domain start position and a time domain resource length, and the terminal determines that one data packet is transmitted on continuous time domain units, and different data packets are transmitted on continuous time domain units. That is, the idle time domain units included in all adjacent transmission units are continuous. Alternatively, the terminal determines that one data packet is transmitted on continuous time domain units and that different data packets are transmitted on non-continuous time domain unit. That is, there are non-continuous idle time domain units included in at least one group of adjacent transmission units. In this case, the terminal may determine the transmission unit according to the time domain start position and the length of the time domain resource.

Assuming that the time domain start position of the first data packet indicated by the scheduling indication is the 8th symbol and the length of the time domain resource is two symbols, the terminal may determine that the transmission unit carrying the first data packet includes the 8th-9th symbols; if the time domain start position of the second data packet indicated by the scheduling indication is the 11th symbol and the length of the time domain resource is two symbols, the terminal determines that the transmission unit carrying the second data packet includes the 11th-12th symbols; if the time domain start position of the third data packet indicated by the scheduling indication is the 13th symbol and the length of the time domain resource is two symbols, the terminal determines that the transmission unit carrying the third data packet includes the 13th-14th symbols. Assuming that the time domain start position of the first data packet indicated by the scheduling indication is the 8th symbol and the length of the time domain resource is four symbols, the terminal determines that the transmission unit carrying the first data packet includes the 8th-11th symbols; if the start time domain position of the second data packet indicated by the scheduling indication is the 13th symbol and the length of the time domain resource is two symbols, the terminal determines that the transmission unit carrying the second data packet contains the 13th-14th symbols.

3) Corresponding to the third implementation described above, the scheduling indication indicates a time domain start position, the time domain length indication indicates a time domain length of the transmission unit, and the terminal determines that one data packet is transmitted on continuous time domain units and different data packets are transmitted on continuous time domain units. That is, idle time domain units included in all adjacent transmission units are continuous. Alternatively, the terminal determines that one data packet is transmitted on continuous time domain units and that different data packets are transmitted on non-continuous time domain units. That is, there are non-continuous idle time domain units included in at least one group of adjacent transmission units. In this case, the terminal may determine the transmission unit according to the time domain start position and the time domain length of the transmission unit.

Assuming that the time domain start position of the first data packet indicated by the scheduling indication is the 8th symbol and the time domain length of the transmission unit indicated by the time domain length indication is two symbols, the terminal may determine that the transmission unit carrying the first data packet includes the 8th-9th symbols; if the time domain start position of the second data packet indicated by the scheduling indication is the 11th symbol and the time domain length of the transmission unit indicated by the time domain length indication is two symbols, the terminal may determine that the transmission unit carrying the second data packet includes the 11th-12th symbols; if the start time domain position of the third data packet indicated by the scheduling indication is the 13th symbol and the time domain length of the transmission unit indicated by the time domain length indication is two symbols, the terminal may determine that the transmission unit carrying the third data packet includes the 13th-14th symbol. Assuming that the time domain start position of the first data packet indicated by the scheduling indication is the 8th symbol and the time domain length of the transmission unit indicated by the time domain length indication is four symbols, the terminal may determine that the transmission unit carrying the first data packet includes the 8th-11th symbols; if the time domain start position of the second data packet indicated by the scheduling indication is the 11th symbol and the time domain length of the transmission unit indicated by the time domain length indication is two symbols, the terminal may determine that the transmission unit carrying the second data packet includes the 13th-14th symbols.

4) Corresponding to the fourth implementation described above, the scheduling indication indicates a time domain start position, and the terminal determines that one data packet is transmitted on continuous time domain units, and that different data packets are transmitted on continuous time domain unit. That is, the idle time domain units included in all adjacent transmission units are continuous. Alternatively, the terminal determines that one data packet is transmitted on continuous time domain units and that different data packets are transmitted on non-continuous time domain units, that is, there are non-continuous idle time domain units included in at least one group of adjacent transmission units. In this case, the terminal further needs to acquire the time domain length of the transmission unit, and determine the transmission unit according to the time domain start position and the time domain length of the transmission unit.

Before determining the transmission unit, the terminal further needs to acquire a time domain length indication, and then determine the time domain length of the transmission unit according to the time domain length indication. When the time domain length indication is predefined in the terminal, the terminal may directly read the time domain length indication from the terminal, and then determine the predefined time domain length of the transmission unit according to the time domain length indication. When the time domain length indication is not predefined in the terminal, the terminal may receive the time domain length indication from the access network device, and then determine the predefined time domain length of the transmission unit according to the time domain length indication.

Assuming that the time domain length of the transmission unit indicated by the time domain length indication is two symbols, and the time domain start positions of the three data packets indicated by the scheduling indication are the 8th symbol, the 11th symbol and the 13th symbol, respectively, the terminal may determine that the transmission unit carrying the first data packet includes the 8th-9th symbols, the transmission unit carrying the second data packet includes the 11th-12th symbols, and the transmission unit carrying the third data packet includes the 13th-14th symbols. Assuming that the time domain lengths of the transmission units indicated by the time domain length indication are four symbols and two symbols, respectively, and the time domain start positions of the two data packets indicated by the scheduling indication are respectively the 8th symbol and the 13th symbol, the terminal determines that the transmission unit carrying the first data packet includes the 8th-11th symbols, and the transmission unit carrying the second data packet includes the 13th-14th symbols.

Operations 501-503 may be implemented as an embodiment on the access network device side alone, and operations 504-505 may be implemented as an embodiment on the terminal side alone.

In summary, in the transmission configuration method provided by the present disclosure, transmission units with different time domain lengths are predefined, and the time domain length of the transmission unit herein refers to the number of time domain units included in the transmission unit. In this way, no matter how many idle time domain units exist within a time window, the idle time domain units can be combined to obtain at least one transmission unit according to a predefined time domain length of each transmission unit. The transmission unit is configured to carry data packet(s) for transmission, it is thus possible to solve a problem of wasting channel resources due to a fact that when a data packet can only be transmitted on a fixed idle time domain unit, if a successfully-occupied idle time domain unit is earlier than the fixed idle time domain unit, the data packet is still not transmitted until the fixed idle time domain unit arrives after waiting; and to achieve an effect of saving the channel resources. It is also possible to solve a problem of having a low data transmission efficiency due to a fact that when a data packet can only be transmitted on a fixed idle time domain unit, if the idle time domain unit is not occupied successfully, the access network device and the terminal need to wait until the next time window to transmit the data packet again; and to achieve an effect of improving the data transmission efficiency.

Figure 7:
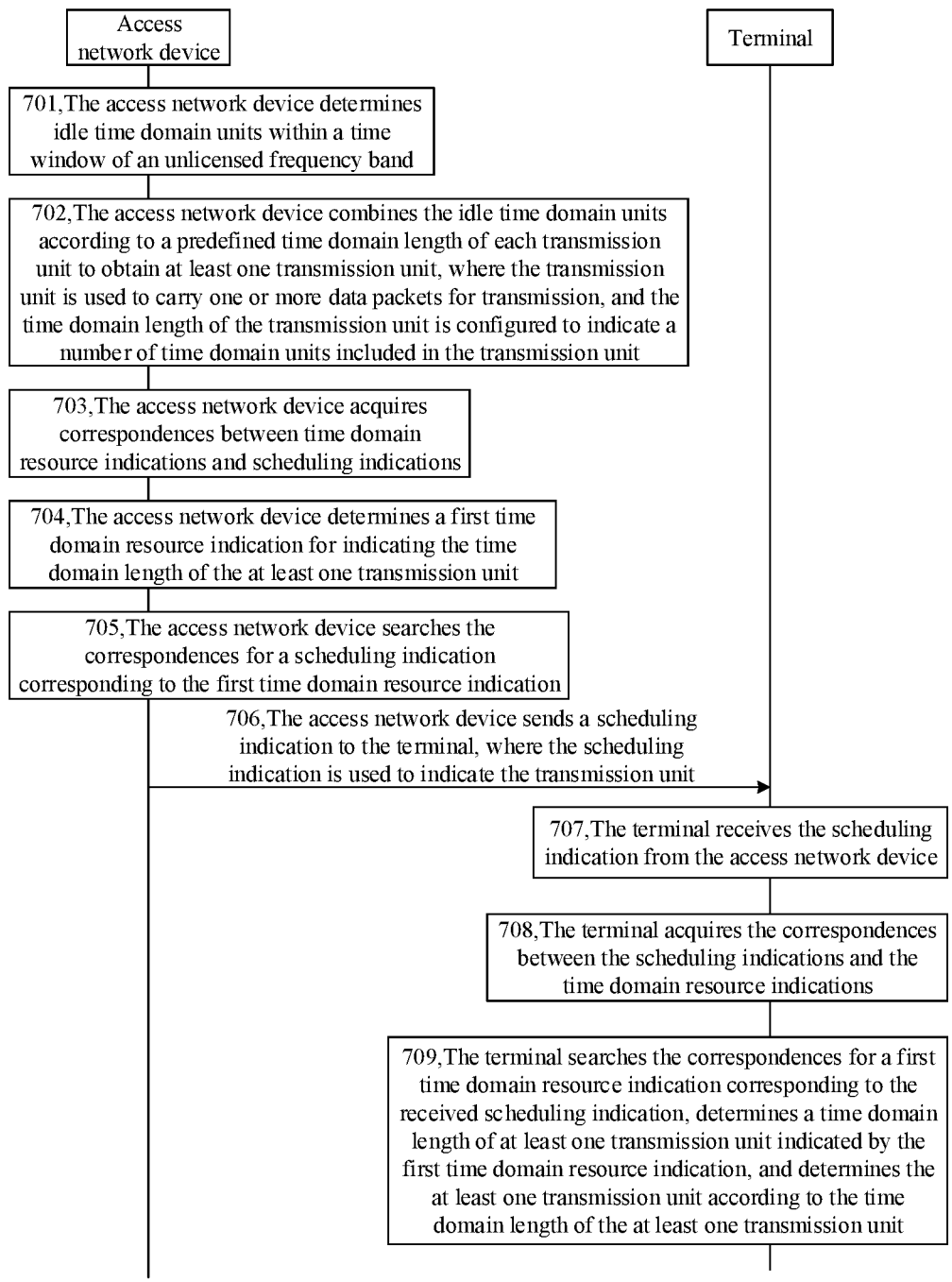
FIG. 7 is a flowchart of a transmission configuration method, according to an exemplary embodiment.

FIG. 7 is a flowchart of a transmission configuration method according to another exemplary embodiment, the method applied to the mobile communication system shown in FIG. 3. As shown in FIG. 7, the transmission configuration method includes the following operations.

In operation 701, the access network device determines idle time domain units within a time window of an unlicensed frequency band.

In operation 702, the access network device combines the idle time domain units according to a predefined time domain length of each transmission unit to obtain at least one transmission unit, where the transmission unit is used to carry data packet(s) for transmission, and the time domain length of the transmission unit is used to indicate a number of time domain units included in the transmission unit.

The implementation flow of operations 701-702 has been described in detail in operations 501-502, and will not be described herein.

In operation 703, the access network device acquires correspondences between time domain resource indications and scheduling indications.

A time domain resource indication is used to indicate a time domain length of at least one transmission unit. For instance, the access network device may define a time domain resource indication to indicate that the time domain lengths of two transmission units are two symbols and three symbols, respectively; another time domain resource indication is used to indicate that the time domain lengths of the three transmission units are respectively two symbols, three symbols and three symbols; a third time domain resource indication is used to indicate that the time domain lengths of the three transmission units are respectively three symbols, three symbols, and two symbols.

The access network device may further generate correspondences between time domain resource indications and scheduling indications, and the scheduling indication herein may be understood as an index of the time domain resource indication. Taking the above enumerated three time domain resource indications as an example, the correspondences are shown in Table 1 below.

TABLE 1

| Scheduling indication | Time domain resource indication |
| --- | --- |
| 1 | 2 symbols, 3 symbols |
| 2 | 2 symbols, 3 symbols, 3 symbols |
| 3 | 3 symbols, 3 symbols, 2 symbols |

The correspondences in Table 1 are examples, in actual implementation, the access network device may define other correspondences according to actual requirements, which is not limited in the embodiment.

Since the terminal also needs to acquire the correspondences, when the correspondences are not predefined in the terminal, the access network device needs to send the correspondences to the terminal. When the correspondences are predefined in the terminal, the terminal may directly read the correspondences from the terminal, and the access network device does not need to send the correspondences to the terminal.

In operation 704, the access network device determines a first time domain resource indication for indicating the time domain length of the at least one transmission unit.

After obtaining the at least one transmission unit by combination in operation 702, the access network device may generate the first time domain resource indication according to the time domain length of the at least one transmission unit. Assuming that the idle time domain units are the 7th-14th symbols and that the transmission units obtained according to the service requirements of the terminal are one transmission unit including two symbols and two transmission units each including three symbols, the first time domain resource indication is two symbols, three symbols and three symbols.

For ease of differentiation, in the embodiment, the time domain resource indication used to indicate an actual transmission unit is referred to a first time domain resource indication, and the content of the first resource indication may be the same as the content of any time domain resource indication in the correspondences.

In operation 705, the access network device searches the correspondences for a scheduling indication corresponding to the first time domain resource indication.

Taking the first time domain resource indication in operation 704 as an example, the scheduling indication searched out by the access network device is two.

In operation 706, the access network device sends a scheduling indication to the terminal, where the scheduling indication is used to indicate the transmission unit.

In operation 707, the terminal receives the scheduling indication from the access network device.

In operation 708, the terminal acquires correspondences between the scheduling indications and the time domain resource indications.

When the correspondences are not predefined in the terminal, the access network device sends the correspondences to the terminal, and the terminal receives the correspondences from the access network device. When the correspondences are predefined in the terminal, the terminal may directly read the corresponding relationship.

In operation 709, the terminal searches the correspondences for a first time domain resource indication corresponding to the received scheduling indication, determines a time domain length of at least one transmission unit indicated by the first time domain resource indication, and determines the at least one transmission unit according to the time domain length of the at least one transmission unit.

After acquiring the correspondences, the terminal may search the correspondences for the first time domain resource indication corresponding to the scheduling indication. For instance, if the scheduling indication is 2, the first time domain resource indication searched out by the terminal is used to indicate two symbols, three symbols, and three symbols.

After determining the time domain length of the at least one transmission unit, the terminal may use, a next symbol of the symbol for transmitting the scheduling indication, as a time domain start position, and determine the at least one transmission unit according to the time domain start position and the time domain length of the at least one transmission unit. In this case, the idle time domain units included in all adjacent transmission units are continuously.

Assuming that the start position of the time domain is the 7th symbol, then the first transmission unit includes the 7th-8th symbols, the second transmission unit includes the 9th-11th symbols, and the third transmission unit includes the 12th-14th symbols.

Herein, operations 701-706 may be separately implemented as an embodiment on the access network device side, and operations 707-709 may be separately implemented as an embodiment on the terminal side.

In summary, in the transmission configuration method provided by the present disclosure, transmission units with different time domain lengths are predefined, and the time domain length of a transmission unit herein refers to a number of time domain units included in the transmission unit. In this way, no matter how many idle time domain units exist within a time window, the idle time domain units can be combined to obtain at least one transmission unit according to a predefined time domain length of each transmission unit. The transmission unit is configured to carry data packet(s) for transmission, it is thus possible to solve a problem of wasting channel resources due to a fact that when a data packet can only be transmitted on a fixed idle time domain unit, if a successfully-occupied idle time domain unit is earlier than the fixed idle time domain unit, the data packet is still not transmitted until the fixed idle time domain unit arrives after waiting; and to achieve an effect of saving the channel resources. It is also possible to solve a problem of having a low data transmission efficiency due to a fact that when a data packet can only be transmitted on a fixed idle time domain unit, if the idle time domain unit is not occupied successfully, the access network device and the terminal need to wait until the next time window to transmit the data packet again; and to achieve an effect of improving the data transmission efficiency.

Figure 8:
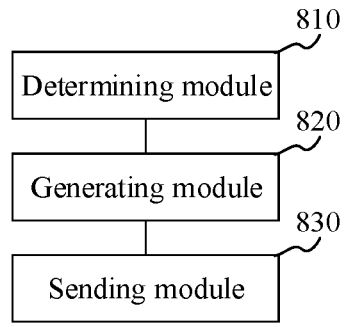
FIG. 8 is a block diagram of a transmission configuration apparatus, according to an exemplary embodiment.

FIG. 8 is a block diagram of a transmission configuration apparatus according to another exemplary embodiment, the transmission configuration apparatus applied to the access network device 301 shown in FIG. 3. As shown in FIG. 8, the transmission configuration apparatus includes a determination module 810, a generating module 820, and a sending module 830.

The determining module 810 is configured to determine idle time domain units within a time window of an unlicensed frequency band.

The generating module 820 is configured to combine the idle time domain units determined by the determining module 810 according to a predefined time domain length of each transmission unit to obtain at least one transmission unit, the transmission unit is configured to carry data packet(s) for transmission, and the time domain length of the transmission unit is configured to indicate a number of time domain units included in the transmission unit.

The sending module 830 is configured to send a scheduling indication to the terminal, and the scheduling indication is used to indicate at least one transmission unit.

In one embodiment of the present disclosure, idle time domain units included in all adjacent transmission units are continuous, and the transmission unit is represented by a time domain start position for transmitting the data packets, and the scheduling indication is used to indicate the time domain start position.

In one embodiment of the present disclosure, the transmission unit is represented by a time domain start position for transmitting the data packets and a length of one or more time domain resources occupied by the data packets, and the scheduling indication is used to indicate the time domain start position and the lengths of the time domain resource.

In one embodiment of the present disclosure, the transmission unit is represented by a time domain start position for transmitting the data packets and a time domain length of the transmission unit, the scheduling indication is used to indicate the time domain start position, and the sending module 830 is further configured to send a time domain length indication to the terminal, the time domain length indication being used to indicate the time domain length of the transmission unit.

In one embodiment of the present disclosure, the transmission unit is represented by a time domain start position for transmitting the data packet and a time domain length of the transmission unit, the scheduling indication is used to indicate the time domain start position, and the terminal determines the time domain length of the transmission unit according to a time domain length indication predefined in the terminal.

Figure 9:
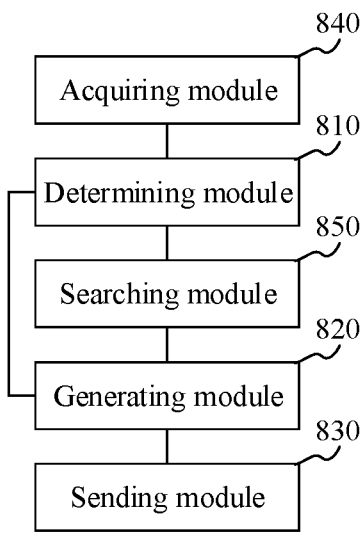
FIG. 9 is a block diagram of a transmission configuration apparatus, according to an exemplary embodiment.

Please referring to FIG. 9, in an embodiment of the present disclosure, the apparatus further includes an acquiring module 840 and a searching module 850.

The acquiring module 840 is configured to acquire correspondences between time domain resource indications and scheduling indications.

The determining module 810 is further configured to determine a first time domain resource indication for indicating the time domain length of each of the at least one transmission unit.

The searching module 850 is further configured to search the correspondences for a scheduling indication corresponding to the first time domain resource indication.

In one embodiment of the present disclosure, the sending module 830 is further configured to send the correspondences to the terminal.

In summary, in the transmission configuration apparatus provided by the present disclosure, transmission units with different time domain lengths are predefined, a time domain length of a transmission unit herein refers to a number of time domain units included in the transmission unit. In this way, no matter how many idle time domain units exist within a time window, the idle time domain units can be combined to obtain at least one transmission unit according to a predefined time domain length of each transmission unit. The transmission unit is configured to carry data packet(s) for transmission, it is thus possible to solve a problem of wasting channel resources due to a fact that when a data packet can only be transmitted on a fixed idle time domain unit, if a successfully-occupied idle time domain unit is earlier than the fixed idle time domain unit, the data packet is still not transmitted until the fixed idle time domain unit arrives after waiting; and to achieve an effect of saving the channel resources. It is also possible to solve a problem of having a low data transmission efficiency due to a fact that when a data packet can only be transmitted on a fixed idle time domain unit, if the idle time domain unit is not occupied successfully, the access network device and the terminal need to wait until the next time window to transmit the data packet again; and to achieve an effect of improving the data transmission efficiency.

Figure 10:
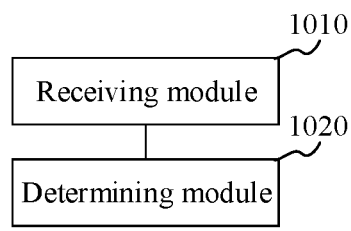
FIG. 10 is a block diagram of a transmission configuration apparatus, according to an exemplary embodiment.

FIG. 10 is a block diagram of a transmission configuration apparatus according to an exemplary embodiment, the transmission configuration apparatus is applied to the terminal 302 shown in FIG. 3. As shown in FIG. 10, the transmission configuration apparatus includes a receiving module 1010 and a determining module 1020.

The receiving module 1010 is configured to receive a scheduling indication from an access network device, the scheduling indication is used to indicate at least one transmission unit for carrying data packets transmission, the transmission unit is obtained by combining idle time domain units within a time window of an unlicensed frequency band.

The determining module 1020 is configured to determine at least one transmission unit according to the scheduling indication received by the receiving module 1010.

In one embodiment of the present disclosure, idle time domain units in all adjacent transmission units are continuous, and the transmission unit is represented by a time domain start position for transmitting the data packets, and the scheduling indication is used to indicate the time domain start position.

In one embodiment of the present disclosure, a transmission unit is represented by a time domain start position for transmitting the data packets and a length of one or more time domain resources occupied by the data packets, and the scheduling indication is used to indicate the time domain start position and the length of the time domain resources.

In one embodiment of the present disclosure, a transmission unit is represented by a time domain start position for transmitting the data packets and the time domain length of the transmission unit, the time domain length of the transmission unit is used to indicate the number of time domain units included in the transmission unit, the scheduling indication is used to indicate the time domain start position, and the receiving module 1010 is further configured to receive a time domain length indication sent by the access network device, the time domain length indication is used to indicate the time domain length of the transmission unit.

Figure 11:
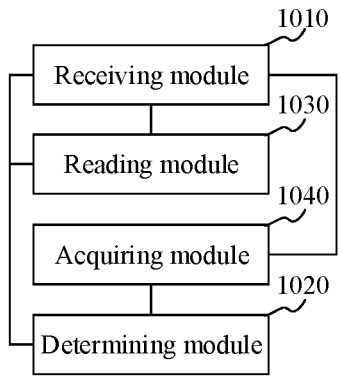
FIG. 11 is a block diagram of a transmission configuration apparatus, according to an exemplary embodiment.

Referring to FIG. 11, in an embodiment of the present disclosure, a transmission unit is represented by a time domain start position for transmitting the data packets and a time domain length of the transmission unit, the time domain length of the transmission unit is used to indicate a number of time domain units included in the transmission unit, the scheduling indication is used to indicate the time domain start position, and the apparatus further includes a reading module 1030.

The reading module 1030 is configured to read a time domain length indication predefined in the terminal, the time domain length indication is used to indicate the time domain length of the transmission unit.

In one embodiment of the present disclosure, the apparatus further includes an acquiring module 1040.

The acquiring module 1040 is configured to acquire correspondences between scheduling indications and time domain resource indications.

The determining module 1020 is further configured to: search the correspondences for a first time domain resource indication corresponding to the received scheduling indication; determine a time domain length of each of at least one transmission unit indicated by the first time domain resource indication; determine the at least one transmission unit according to the time domain length of each of the at least one transmission unit.

In an embodiment of the present disclosure, the acquiring module 1040 is further configured to: read predefined correspondences in the terminal, or receive correspondences from the access network device.

In summary, in the transmission configuration apparatus provided by the present disclosure, a time domain length of a transmission unit herein refers to a number of time domain units included in the transmission unit. In this way, no matter how many idle time domain units exist within a time window, the idle time domain units can be combined to obtain at least one transmission unit according to a predefined time domain length of each transmission unit. The transmission unit is configured to carry data packet(s) for transmission, it is thus possible to solve a problem of wasting channel resources due to a fact that when a data packet can only be transmitted on a fixed idle time domain unit, if a successfully-occupied idle time domain unit is earlier than the fixed idle time domain unit, the data packet is still not transmitted until the fixed idle time domain unit arrives after waiting; and to achieve an effect of saving the channel resources. It is also possible to solve a problem of having a low data transmission efficiency due to a fact that when a data packet can only be transmitted on a fixed idle time domain unit, if the idle time domain unit is not occupied successfully, the access network device and the terminal need to wait until the next time window to transmit the data packet again; and to achieve an effect of improving the data transmission efficiency.

An exemplary embodiment of the present disclosure provides an access network device capable of implementing the transmission configuration method provided by the present disclosure, the access network device includes a processor, memory for storing instructions executable by the processor.

Herein the processor is configured to:
determine idle time domain units within a time window of an unlicensed frequency band;
combine the idle time domain units according to a predefined time domain length of each transmission unit to obtain at least one transmission unit, where the transmission unit is configured to carry data packet(s) for transmission, and the time domain length of the transmission unit is configured to indicate a number of time domain units included in the transmission unit; and
send a scheduling indication to a terminal, the scheduling indication is used to indicate at least one transmission unit.

An exemplary embodiment of the present disclosure provides a terminal capable of implementing the transmission configuration method provided by the present disclosure, the terminal includes a processor, memory for storing instructions executable by the processor.

Herein the processor is configured to:
receive a scheduling indication from an access network device, where the scheduling indication is used to indicate at least one transmission unit for carrying data packet(s) for transmission, and the transmission unit is obtained by combining idle time domain units within a time window of an unlicensed frequency band; and
determine the at least one transmission unit according to the scheduling indication.

Figure 12:
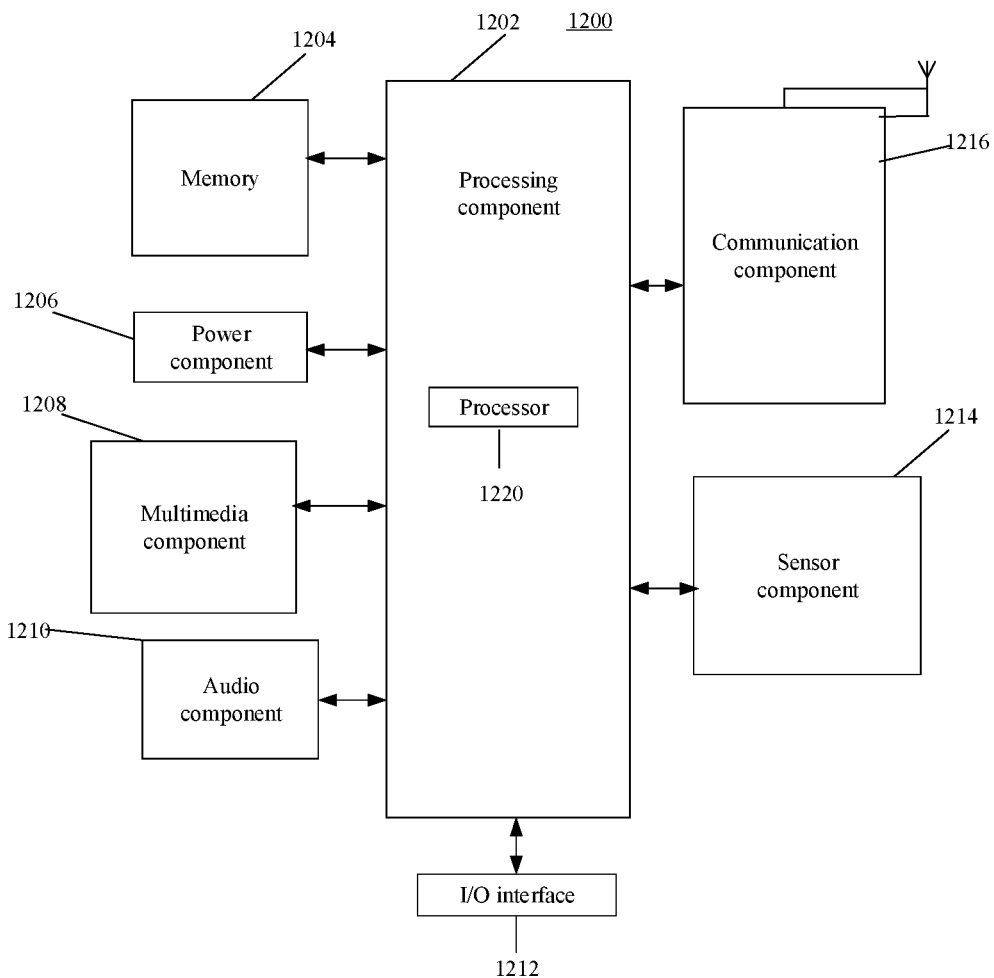
FIG. 12 is a block diagram of an apparatus for a transmission configuration, according to an exemplary embodiment.

FIG. 12 is a block diagram of an apparatus 1200 for a transmission configuration according to an exemplary embodiment. For instance, the apparatus 1200 may be a mobile phone, a computer, a digital broadcast terminal, a messaging device, a game console, a tablet device, a medical device, a fitness device, a personal digital assistant, or the like.

Referring to FIG. 12, the apparatus 1200 may include one or more of following components: a processing component 1202, memory 1204, a power component 1206, a multimedia component 1208, an audio component 1210, an Input/Output (I/O) interface 1212, a sensor component 1214, and a communication component 1216.

Processing component 1202 typically controls the overall operations of apparatus 1200, such as operations associated with display, telephone calls, data communications, camera operations, and recording operations. The processing component 1202 may include one or more processors 1220 to execute instructions to perform all or part of the operations in the abovementioned method. Moreover, the processing component 1202 may include one or more modules which facilitate interaction between the processing component 1202 and other components. For instance, the processing component 1202 may include a multimedia module to facilitate interaction between a multimedia component 1208 and the processing component 1202.

The memory 1204 is configured to store various types of data to support operation of the device 1200. Examples of such data include instructions for any applications or methods operating on the apparatus 1200, contact data, phonebook data, messages, pictures, videos, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 provides power for various components of the apparatus 1200. The power component 1206 may include a power management system, one or more power supplies, and other components associated with generating, management, and distributing power for the apparatus 1200.

The multimedia component 1208 includes a screen providing an output interface between the apparatus 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes, and gestures on the TP. The touch sensors may not only sense a boundary of a touch or swipe action, but also detect a duration and pressure associated with the touch or swipe action. In some embodiments, the multimedia component 1208 includes a front camera and/or a rear camera. The front camera and/or the rear camera may receive external multimedia data when the apparatus 1200 is in an operating mode, such as photographing mode or a video mode. Each of the front camera and the rear camera may be a fixed optical lens system or have focusing and optical zooming capabilities.

The audio component 1210 is configured to output and/or input audio signals. For instance, the audio component 1210 includes a Microphone (MIC), and the MIC is configured to receive an external audio signal when the apparatus 1200 is in the operation mode, such as a call mode, a recording mode and a voice recognition mode. The received audio signal may further be stored in the memory 1204 or sent through the communication component 716. In some embodiments, the audio component 1210 further includes a speaker configured to output the audio signal.

The I/O interface 1212 provides an interface between the processing component 1202 and a peripheral interface module, and the peripheral interface module may be a keyboard, a click wheel, a button and the like. The button may include, but not limited to: a home button, a volume button, a starting button, and a locking button.

The sensor component 1214 includes one or more sensors configured to provide status assessment in various aspects for the apparatus 1200. For instance, the sensor component 1214 may detect an off/on status of the apparatus 1200, relative positioning of components, such as display and small keyboard of the apparatus 1200, and the sensor component 1214 may further detect a change in a position of the apparatus 1200 or a component of the apparatus 1200, presence or absence of contact between the user and the apparatus 1200, orientation or acceleration/deceleration of the apparatus 1200 and a change in temperature of the apparatus 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging APP. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and another device. The apparatus 1200 may access a communication-standard-based wireless network, such as a Wi-Fi network, a 2nd-Generation (2G) or 3rd-Generation (3G) network or a combination thereof. In an exemplary embodiment, the communication component 1216 receives a broadcast signal or broadcast associated information from an external broadcast management system through a broadcast channel. In an exemplary embodiment, the communication component 1216 further includes an NFC module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the apparatus 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the abovementioned method.

In an exemplary embodiment, there is also provided a non-transitory computer-readable storage medium including an instruction, such as the memory 1204 including an instruction, and the instruction may be executed by the processor 1220 of the apparatus 1200 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

A non-transitory computer-readable storage medium, an instruction in the storage medium is executed by a processor of a mobile terminal to enable the mobile terminal to perform a network configuration method.

Figure 13:
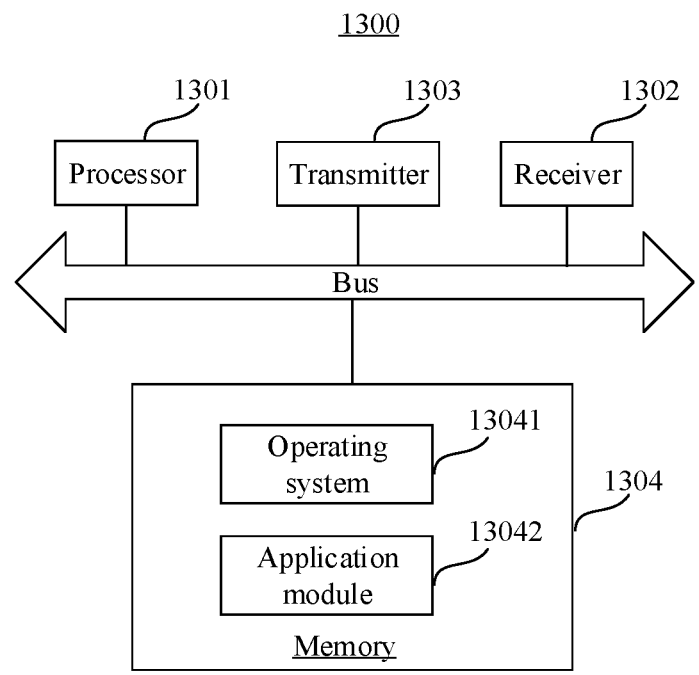
FIG. 13 is a block diagram of a transmission configuration apparatus, according to an exemplary embodiment.

FIG. 13 is a block diagram of a transmission configuration apparatus 1300 according to an exemplary embodiment. For instance, the transmission configuration apparatus 1300 may be an access network device or be located in an access network device. As shown in FIG. 13, the transmission configuration apparatus 1300 may include a processor 1301, a receiver 1302, a transmitter 1303 and memory 1304. The receiver 1302, the transmitter 1303 and the memory 1304 are connected to the processor 1301 via a bus, respectively.

Wherein the processor 1301 includes one or more processing cores, and the processor 1301 executes a method performed by the access network device in the transmission configuration method provided by the embodiments of the present disclosure by executing software programs and modules. The memory 1304 may be configured to store software programs and modules. In particular, the memory 1304 may store an operating system 13041, an application module 13042 required for at least one function. The receiver 1302 is configured to receive communication data transmitted by other devices, and the transmitter 1303 is configured to transmit communication data to the other devices.

Figure 14:
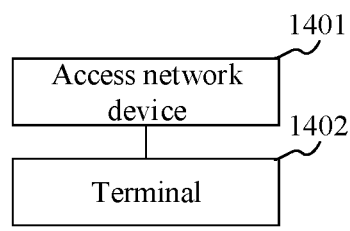
FIG. 14 is a block diagram of a mobile communication system, according to an exemplary embodiment.

FIG. 14 is a block diagram of a mobile communication system according to an exemplary embodiment, the mobile communication system includes an access network device 1401 and a terminal 1402.

The access network device 1401 is configured to perform a transmission configuration method performed by the access network device in the embodiments shown in FIGS. 4 to 7.

The terminal 1402 is configured to perform the transmission configuration method performed by the terminal in the embodiments shown in FIGS. 4 to 7.

An exemplary embodiment of the present disclosure provides a non-transitory computer-readable storage medium, in which at least one instruction, at least one program segment, code set or instruction set is stored, the at least one instruction, the at least one program segment, the code set or instruction set is loaded and executed by the processor to perform the transmission configuration method described above.

Other implementation solutions of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed:

1. A transmission configuration method, comprising:
   determining, by an access network device, idle time domain units within a time window of an unlicensed frequency band, the idle time domain units within the time window are remaining time domain units in the time window that can be used to carry data for transmission after the access network device successfully occupies a channel resource;
   combining, by the access network device, the idle time domain units according to a predefined time domain length of each transmission unit to obtain at least one transmission unit, the transmission unit being configured to carry one or more data packets for transmission, and the time domain length of the transmission unit being configured to indicate a number of time domain units included in the transmission unit;
   acquiring, by the access network device, correspondences between time domain resource indications and scheduling indications;
   determining, by the access network device, a first time domain resource indication for indicating the time domain length of each of the at least one transmission unit;
   searching, by the access network device, the correspondences for a scheduling indication corresponding to the first time domain resource indication; and
   sending, by the access network device, a searched-out scheduling indication to a terminal, the searched-out scheduling indication being configured to indicate the at least one transmission unit.

2. The method of claim 1, wherein idle time domain units included in all adjacent transmission units are continuous, and the transmission unit is represented by a time domain start position for transmitting the data packets, and wherein the searched-out scheduling indication is configured to indicate the time domain start position.

3. The method of claim 1, wherein the transmission unit is represented by a time domain start position for transmitting the data packets and a length of one or more time domain resources occupied by the data packets, and the searched-out scheduling indication is configured to indicate the time domain start position and the length of the time domain resources.

4. The method of claim 1, wherein the transmission unit is represented by a time domain start position for transmitting the data packets and the time domain length of the transmission unit, the searched-out scheduling indication is configured to indicate the time domain start position, and the method further comprises:
   sending, by the access network device, a time domain length indication to the terminal, the time domain length indication being configured to indicate the time domain length of the transmission unit.

5. The method of claim 1, wherein the transmission unit is represented by a time domain start position for transmitting the data packets and the time domain length of the transmission unit, and wherein the searched-out scheduling indication is configured to indicate the time domain start position, and the terminal determines the time domain length of the transmission unit according to a time domain length indication predefined in the terminal.

6. The method of claim 1, further comprising:
   sending, by the access network device, the correspondences to the terminal.

7. A transmission configuration method, comprising:
   receiving, by a terminal, a scheduling indication from an access network device, a received scheduling indication being configured to indicate at least one transmission unit for carrying one or more data packets for transmission, and the transmission unit being obtained by combining idle time domain units within a time window of an unlicensed frequency band, the idle time domain units within the time window are remaining time domain units in the time window that can be used to carry data for transmission after the access network device successfully occupies a channel resource;

acquiring, by the terminal, correspondences between scheduling indications and time domain resource indications; and determining, by the terminal, the at least one transmission unit according to the received scheduling indication, wherein determining, by the terminal, the at least one transmission unit according to the received scheduling indication comprises: searching, by the terminal, the correspondences for a first time domain resource indication corresponding to the received scheduling indication; determining, by the terminal, a time domain length of each of at least one transmission unit indicated by the first time domain resource indication; and determining, by the terminal, the at least one transmission unit according to the time domain length of each of the at least one transmission unit.

8. The method of claim 7, wherein the idle time domain units included in all adjacent transmission units are continuous, and the transmission unit is represented by a time domain start position for transmitting the data packets, and wherein the received scheduling indication is configured to indicate the time domain start position.

9. The method of claim 7, wherein the transmission unit is represented by a time domain start position for transmitting the data packets and a length of one or more time domain resources occupied by the data packets, and the received scheduling indication is configured to indicate the time domain start position and the length of the time domain resources.

10. The method of claim 7, wherein the transmission unit is represented by a time domain start position for transmitting the data packets and a time domain length of the transmission unit, the time domain length of the transmission unit is configured to indicate a number of time domain units included in the transmission unit, and the received scheduling indication is configured to indicate the time domain start position, and wherein the method further comprises:

receiving, by the terminal, a time domain length indication from the access network device, the time domain length indication being configured to indicate the time domain length of the transmission unit.

11. The method of claim 7, wherein the transmission unit is represented by a time domain start position for transmitting the data packets and the time domain length of the transmission unit, the time domain length of the transmission unit is configured to indicate a number of time domain units included in the transmission unit, and the received scheduling indication is configured to indicate the time domain start position, and wherein the method further comprises:

reading, by the terminal, a time domain length indication predefined in the terminal, the time domain length indication being configured to indicate the time domain length of the transmission unit.

12. The method of claim 7, wherein acquiring, by the terminal, the correspondences between the scheduling indications and the time domain resource indications comprises:

reading, by the terminal, predefined correspondences in the terminal; or receiving, by the terminal, the correspondences from the access network device.

13. A transmission configuration apparatus implementing the method of claim 8, comprising:

a processor; and memory for storing instructions executable by the processor, wherein the processor is configured to perform steps of the method.

14. A transmission configuration apparatus, comprising:

a processor; and memory for storing instructions executable by the processor, wherein the processor is configured to:

determine idle time domain units within a time window of an unlicensed frequency band, the idle time domain units within the time window are remaining time domain units in the time window that can be used to carry data for transmission after the access network device successfully occupies a channel resource;

combine the idle time domain units according to a predefined time domain length of each transmission unit to obtain at least one transmission unit, the transmission unit being configured to carry one or more data packets for transmission, and the time domain length of the transmission unit being configured to indicate a number of time domain units included in the transmission unit;

acquire correspondences between time domain resource indications and scheduling indications;

determine a first time domain resource indication for indicating the time domain length of each of the at least one transmission unit; and search the correspondences for a scheduling indication corresponding to the first time domain resource indication; and send a searched-out scheduling indication to a terminal, the searched-out scheduling indication being configured to indicate the at least one transmission unit.

15. The transmission configuration apparatus of claim 14, wherein idle time domain units included in all adjacent transmission units are continuous, and the transmission unit is represented by a time domain start position for transmitting the data packets, and wherein the searched-out scheduling indication is configured to indicate the time domain start position.

16. The transmission configuration apparatus of claim 14, wherein the transmission unit is represented by a time domain start position for transmitting the data packets and a length of one or more time domain resources occupied by the data packets, and the searched-out scheduling indication is configured to indicate the time domain start position and the length of the time domain resources.

17. The transmission configuration apparatus of claim 14, wherein the transmission unit is represented by a time domain start position for transmitting the data packets and the time domain length of the transmission unit, the searched-out scheduling indication is configured to indicate the time domain start position, and the processor is further configured to:

send a time domain length indication to the terminal, the time domain length indication being configured to indicate the time domain length of the transmission unit.

18. The transmission configuration apparatus of claim 14, wherein the transmission unit is represented by a time domain start position for transmitting the data packets and the time domain length of the transmission unit, and wherein the searched-out scheduling indication is configured to indicate the time domain start position, and the terminal determines the time domain length of the transmission unit according to a time domain length indication predefined in the terminal.

\* \* \* \* \*